United States Patent
Adibi et al.

(10) Patent No.: US 8,843,104 B2
(45) Date of Patent: Sep. 23, 2014

(54) METHOD AND SYSTEM FOR PEER-TO-PEER (P2P) AD-HOC LOCATION DETERMINATION ROUTING PROTOCOL

(75) Inventors: Sasan Adibi, Kitchener (CA); Christopher Labrador, Waterloo (CA); Sean Simmons, Waterloo (CA)

(73) Assignee: BlackBerry Limited, Waterloo (CA)

( * ) Notice: Subject to any disclaimer, the term of this patent is extended or adjusted under 35 U.S.C. 154(b) by 11 days.

(21) Appl. No.: 13/548,737

(22) Filed: Jul. 13, 2012

(65) Prior Publication Data

US 2013/0017802 A1    Jan. 17, 2013

(30) Foreign Application Priority Data

Jul. 15, 2011   (WO) ................ PCT/CA2011/000801

(51) Int. Cl.
| | |
|---|---|
| H04W 4/22 | (2009.01) |
| H04W 4/02 | (2009.01) |
| H04W 40/00 | (2009.01) |
| H04W 4/12 | (2009.01) |
| H04W 40/22 | (2009.01) |
| H04W 76/02 | (2009.01) |
| H04W 88/06 | (2009.01) |
| H04W 76/00 | (2009.01) |
| H04W 88/04 | (2009.01) |

(52) U.S. Cl.
CPC .............. *H04W 40/22* (2013.01); *H04W 88/06* (2013.01); *H04W 76/007* (2013.01); *H04W 88/04* (2013.01); *H04W 76/023* (2013.01); *H04W 4/02* (2013.01); *H04W 4/22* (2013.01)
USPC ..................... 455/404.1; 455/466; 455/456.6; 455/445

(58) Field of Classification Search
USPC ......... 455/414.01, 414.02, 466, 404.1, 456.6, 455/445; 370/389
See application file for complete search history.

(56) References Cited

U.S. PATENT DOCUMENTS

| | | |
|---|---|---|
| 7,733,224 B2 | 6/2010 | Tran |
| 7,894,794 B2 | 2/2011 | Boss et al. |

(Continued)

FOREIGN PATENT DOCUMENTS

WO     2010107440 A1    9/2010

OTHER PUBLICATIONS

PCT application No. PCT/CA2011/000801, international Search Report and Written Opinion of the International Searching Authority, Mar. 19, 2012.

(Continued)

*Primary Examiner* — Jinsong Hu
*Assistant Examiner* — Jean Chang
(74) *Attorney, Agent, or Firm* — Moffat & Co.

(57) ABSTRACT

Methods that allow a mobile device to communicate with a wireless communications network via device-to-device communication when the device is out of range of the network are provided. One method, at a first mobile device, comprises receiving a message from a second mobile device, adding information to the message, forwarding the message to a network if a network connection is available for the first mobile device, and forwarding the message to a third mobile device if no network connection is available. Another method at a mobile device comprises receiving an indication that an emergency condition exists, sending a message from the device to a network element if a network connection between the mobile device and network element exists, and sending the message from the device to a second mobile device if no network connection between the mobile device and a network element exists. Mobile devices configured to perform these methods are also provided.

24 Claims, 6 Drawing Sheets

(56) References Cited

U.S. PATENT DOCUMENTS

| | | | | |
|---|---|---|---|---|
| 2009/0011763 | A1* | 1/2009 | Torres | 455/435.1 |
| 2009/0075625 | A1 | 3/2009 | Jackson et al. | |
| 2009/0143051 | A1* | 6/2009 | Kim | 455/414.2 |
| 2010/0003958 | A1 | 1/2010 | Ray et al. | |
| 2010/0113075 | A1* | 5/2010 | Lee | 455/466 |
| 2010/0118874 | A1* | 5/2010 | Li | 370/389 |
| 2010/0279647 | A1* | 11/2010 | Jacobs et al. | 455/404.1 |
| 2011/0019587 | A1 | 1/2011 | Wang | |
| 2011/0044276 | A1 | 2/2011 | Albert et al. | |
| 2011/0063105 | A1* | 3/2011 | Bennett et al. | 340/539.11 |
| 2011/0076982 | A1 | 3/2011 | Li et al. | |
| 2011/0115624 | A1 | 5/2011 | Tran | |
| 2012/0100825 | A1* | 4/2012 | Sherman et al. | 455/404.2 |

OTHER PUBLICATIONS

Ian F. Akyildiz, et al, "A Survey on Wireless Mesh Networks", IEEE Radio Communications, Sep. 2005, pp. S23-S30.

Scaglione, Anna et al, "Cooperative Communications in Mobile Ad-Hoc Networks: Rethinking the Link Abstraction".

A. Boukerche, et al, "Vehicular Ad Hoc Networks: A New Challenge for Localization-Based Systems", Computer Communications (2008), doi:10.1016/j.comcom.2007.12.004.

A. Thangavclu, et al "Location Identification and Vehicle Tracking using VANET (VETRAC)", IEEE-ICSCN 2007, MIT Campus, Anna University, Chennai, India, Feb. 22-24, 2007, pp. 112-116.

S. Eichler, et al, "Car-to-Car Communication", VDE Kongress Innovations for Europe, Aachen 2006.

T. King, et al, "Dead-Reckoning for Position-Based Forwarding on Highways", University of Mannheim.

Q. Yu, et al, "Abiding Geocast for Warning Message Dissemination in Vehicular Ad Hoc Networks".

Youseft et al, "Performance of beacon safety message dissemination in Vehicular Ad hoc NETworks (VANETs)", Journal of Zhejiang University Science A. 2007 8(12)1990-2004.

Lee, et al, "Broadband Mobile Ad Hoc Network System for Emergency Communications", Korea.

Loukas et al, "Connecting trapped civilians to a wireless ad hoc network of emergency response robots", IEEE ICCS 2008.

Knopp, et al, "Overview of the Widens Architecture, a Wireless Ad Hoc Network for Public Safety", France.

Loukas et al, "Connecting trapped civilians to a wireless ad hoc network of emergency response robots".

Vermeulen, et al, "Seamless service continuity between wireless networks", Information Technology for European Advancement.

"Wireless ad hoc network", Wikipedia, Jun. 29, 2011, url: http://en.wikipedia.org/wiki/Wireless_Ad-hoc_network.

Wireless mesh network, Wikipedia, Jun. 29, 2011, url: http://en.wikipedia.org/wiki/Wireless_mesh_networking.

Vehicular ad-hoc network, Wikipedia, Jun. 29, 2011, url: http://en.wikipedia.org/wiki/VANET.

* cited by examiner

METHOD AND SYSTEM FOR PEER-TO-PEER (P2P) AD-HOC LOCATION DETERMINATION ROUTING PROTOCOL

CROSS-REFERENCE TO RELATED APPLICATIONS

The present application claims priority to PCT Application No. PCT/CA2011/000801, having an international filing date of Jul. 15, 2011, the entire contents of which are incorporated herein by reference.

FIELD OF THE DISCLOSURE

The present disclosure relates to communications from a mobile device and in particular to communication from a mobile device that may be out of cell-tower coverage.

BACKGROUND

Mobile network coverage is not universal and tends to be focused around populated areas and major routes between populated areas. When a mobile device moves out of these areas, it may not receive cell-tower coverage and thus be unable to communicate.

The inability to communicate may be problematic when a mobile device requires the transmitting of an important message. Such important messages may, for example, include emergency situations where the mobile device is trying to provide a distress call to an appropriate first responder such as the police department, medical emergency personnel, fire department, among others.

Furthermore, in an emergency situation the mobile device may stop moving and thus be unlikely to re-establish cell-tower coverage within a reasonable time.

BRIEF DESCRIPTION OF THE DRAWINGS

The present disclosure will be better understood with reference to the drawings in which.

DETAILED DESCRIPTION

The present disclosure provides a method at a first mobile device comprising: receiving a message from a second mobile device; adding information to the message; forwarding the message to a network if a network connection is available for the first mobile device; and forwarding the message to a third mobile device if no network connection is available.

The present disclosure further provides a mobile device comprising: a processor; and a communications subsystem, wherein the processor and communications subsystem are configured to receive a message from a second mobile device; add information to the message; forward the message to a network if a network connection is available for the first mobile device; and forward the message to a third mobile device if no network connection is available.

The present disclosure further provides a method at a mobile device comprising: receiving an indication that an emergency condition exists; sending a message from the device to a network element if a network connection between the mobile device and network element exists; and sending the message from the device to a second mobile device if no network connection between the mobile device and a network element exists.

The present disclosure still further provides a mobile device comprising: a processor; and a communications subsystem, wherein the processor and communications subsystem are configured to receive an indication that an emergency condition exists; send a message from the device to a network element if a network connection between the mobile device and network element exists; and send the message from the device to a second mobile device if no network connection between the mobile device and a network element exists.

In general, the present the disclosure is provided below with regard to an emergency situation. However, the present systems and methods are not limited to a mobile device being in an emergency situation and could be equally utilized in other situations in which messages can be forwarded when a mobile device is not in cell-tower coverage.

When a device needs to send a message various scenarios exist. For example, referring to FIG. 1, the figure shows the example of a mobile device that has communication with a cell-tower. As used herein, a cell-tower could be any network access point, including a radio frequency base station, a WiFi or WiMAX access point, among others.

Figure 1:
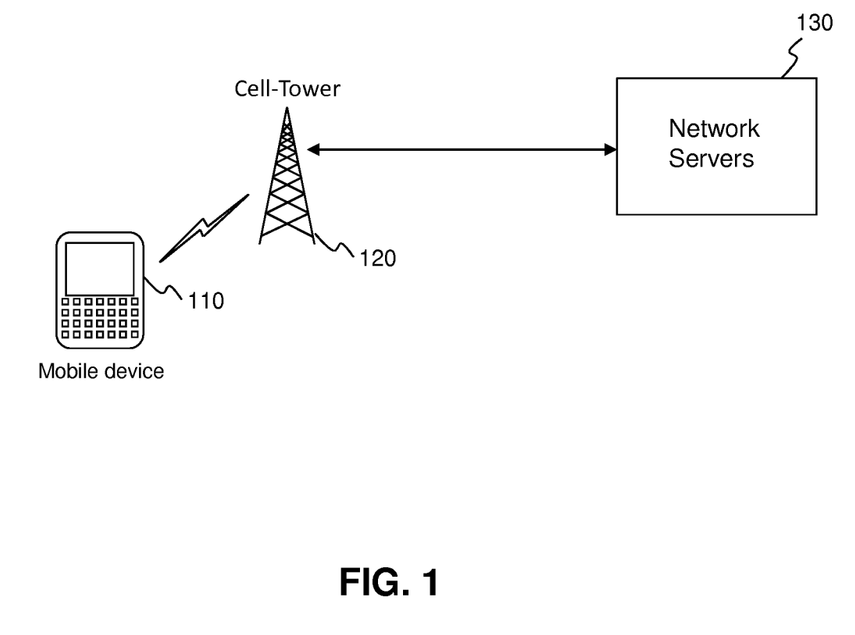
FIG. 1 is a block diagram showing an architecture where a mobile device is capable of communicating with a cell-tower.

If the device 110 needs to communicate with a network through cell-tower 120 then the device can send direct communications to the cell-tower. Thus, for example, if device 110 is an emergency state it may send the emergency message to the cell-tower containing information to facilitate response to the emergency. In other situations, important messages may be forwarded though cell-tower 120.

The message sent between the mobile device 110 and cell-tower 120 may be packet switched or circuit switched, and may contain data, voice or both.

The message is then passed to network servers 130, which then parse and forward the message to the appropriate recipients in one embodiment.

Figure 2:
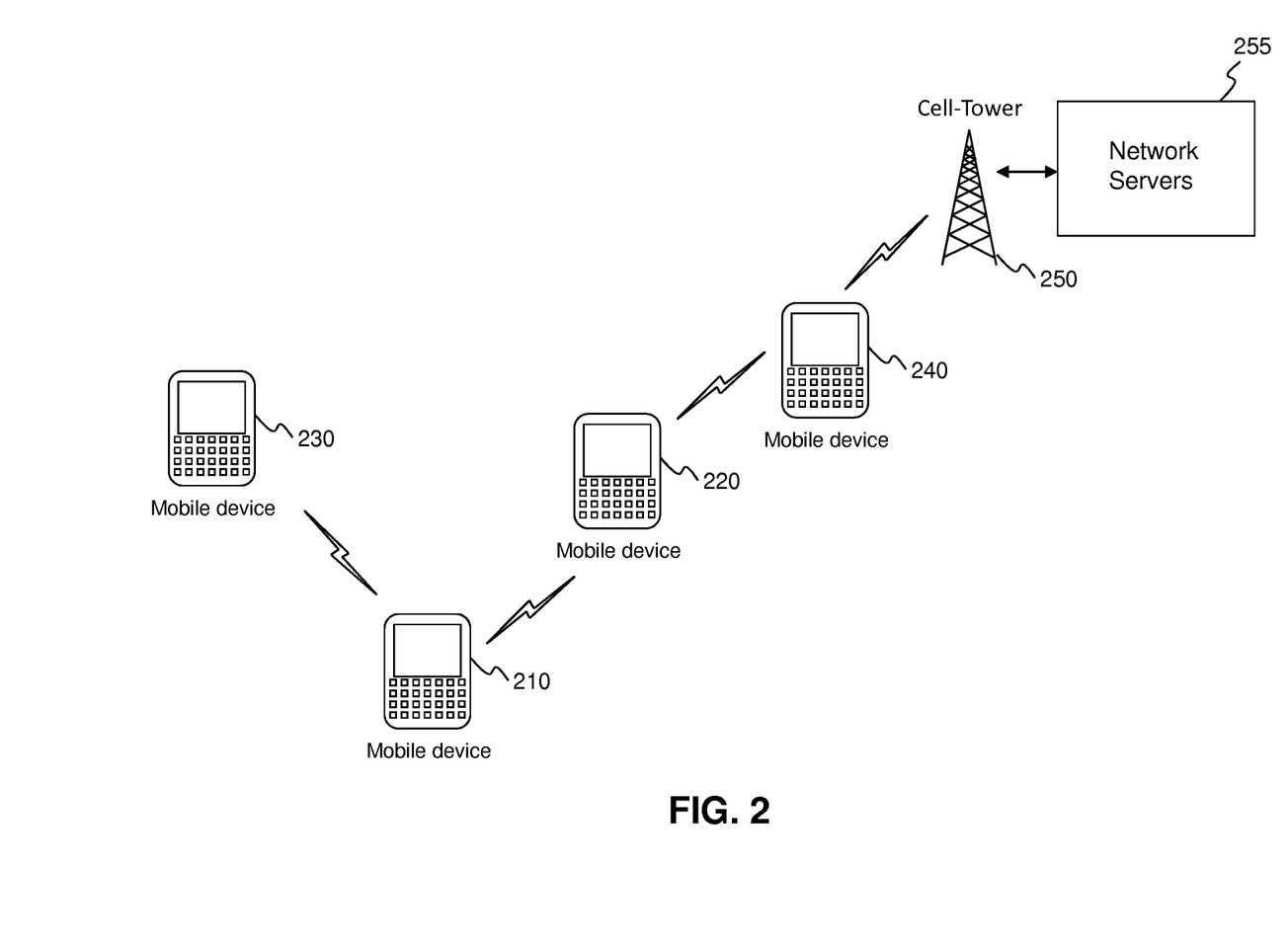
FIG. 2 is a block diagram showing an architecture where a mobile device establishes an ad-hoc network.

If no cell-tower or access point is within reach, one alternative is to establish an ad-hoc-mesh network. Reference is now made to FIG. 2.

In the embodiment of FIG. 2, mobile device 210 requires the sending of a message. For example, mobile device 210 may be in an emergency situation.

In the example of FIG. 2, mobile device 210 tries to communicate with a cell-tower or a network access point and is unable to do so. In this regard, the mobile device 210 tries other available radio technologies, frequencies and channels and probes available beacons. As soon as mobile device 210 receives a beacon, for example, from mobile device 220, it can then send the emergency signal or other communication to mobile device 220.

Alternatively, mobile device 210 may send out its own emergency beacon which may be picked up by a mobile device, for example mobile device 230 which may then send an acknowledgment back to mobile device 210.

In one embodiment, the acknowledgement that is sent when establishing communications between mobile device 210 and mobile devices 220 or 230 may contain a flag to indicate whether or not the mobile devices 220 or 230 have cell-tower coverage. The cell-tower coverage flag may be used at mobile device 210 to decide which of mobile device 220 or 230 to communicate with.

In the example of FIG. 2, neither mobile device 220 or 230 has cell-tower coverage therefore mobile devices 220 and 230 try to communicate with other mobile devices.

In the example of FIG. 2, mobile device 220 can communicate with mobile device 240 and the acknowledgment received back from device 240 at mobile device 220 indicates that mobile device 240 has cell-tower coverage. In particular, mobile device 240 can communicate with cell-tower or access point 250, which then communicates with network servers 255.

As will be appreciated by those in the art having regard to the present disclosure, the embodiment of FIG. 2 is a simplified model and each mobile device may be capable of communicating with a plurality of mobile devices.

Once a cell-tower or access point connection has been found, a mesh link may be established. In one embodiment, the mesh link may be the best quality mesh link available with the highest receipt signal strength value. The link will be formed with the cell-tower 250 at one end and the mobile device 210 which requires the message to be sent at the other end. Thereafter, mobile device 210 is capable of communicating with a network to provide communication such as emergency information to a first responder.

If, for example, mobile device 220 moves out of radio frequency range of mobile device 210, thus breaking the link, the tasks of mobile device 220 may be handed off to other incoming mobile devices. Therefore, each mobile device in the mesh link, in one embodiment, continuously looks for potential roaming mobile devices entering the domain, thus keeping the ad-hoc-mesh network dynamic.

Figure 3:
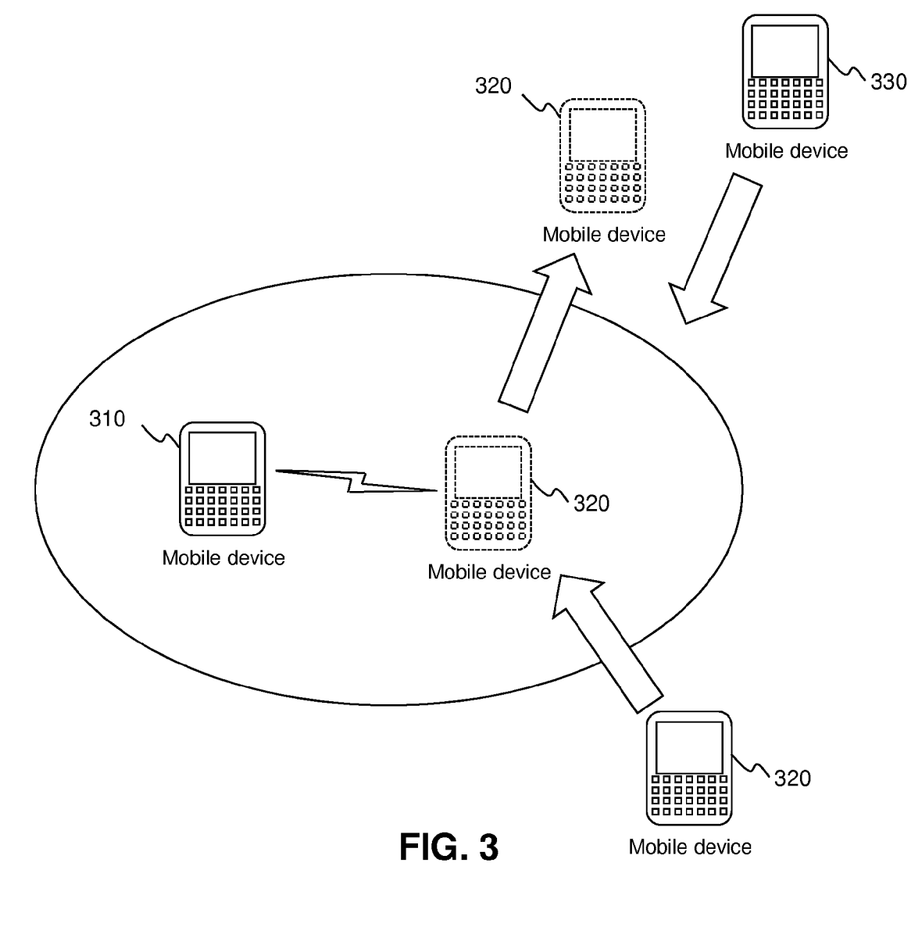
FIG. 3 is a block diagram showing an architecture for a store and forward model.

However, in rural areas with very few mobile devices, it may be physically impossible to maintain a mesh link between a mobile device that needs to send a message and an access point or cell-tower. In particular, when a second mobile device is only within radio frequency reach for a few seconds of the first mobile device needing to send a message, a store and forward scenario is used in accordance with the present disclosure. Reference is now made to FIG. 3.

In the embodiment of FIG. 3, a mobile device 310 is in an emergency situation. For example, mobile device 310 may belong to a hiker who has fallen and dialed 911. The hiker is in a remote area and is therefore not in cell coverage.

However, mobile device 310 is within radio frequency range of a portion of a highway.

A second mobile device 320 is in a vehicle traveling along the highway and thus for a brief interval, mobile device 310 is within radio frequency communication range of mobile device 320.

In the embodiment of FIG. 3, a mobile device 320 notices the emergency beacon of mobile device 310 but is suddenly out of reach of the mobile device 310. Mobile device 320 thereafter tries to forward the emergency message to a cell-tower.

If mobile device 320 is not in cell-tower coverage, the forwarding of the emergency message may be done through other methods. In one embodiment, forwarding may be accomplished through a mesh network such as that described above with regard to FIG. 2, wherein mobile device 320 comes into range of other mobile devices and can forward the emergency signal to these other devices. Alternatively, mobile device 320 may move into cell-tower or access point coverage at a future point, and thereafter forwards the message to the cell-tower.

The forwarding of the message, in one embodiment involves appending or adding the last known whereabouts of the mobile device 310 to the message prior to forwarding. This information, in the most primitive case, could consist merely of a time stamp of the contact between mobile device 310 and 320. However, the more information mobile device 320 is capable of providing, the easier it will be find mobile device 310.

Thus, the example, if mobile device 320 is capable of receiving GPS signals it may provide more accurate information as to the location of the contact. In other embodiments, mobile device 320 may be capable of tracking speed and direction and provide this information along with the original message when network contact, or other mobile device contact, is established.

Further, a third mobile device 330 may be traveling along the highway in the opposite direction and may also receive the beacon. Thus, if mobile device 320 forwards the emergency message with only a time stamp and mobile device 330 forwards the emergency message with only a time stamp, a network element may use the combined information to help pinpoint the location of mobile device 310.

In some situations, a mobile device may pass information to other devices travelling in the opposite direction. If, for example, mobile device 320 passed the emergency message to mobile device 330 and then stopped passing messages, the message might be stuck within a region. To avoid this, a mobile device 320 could continue to pass the message until a network connection is confirmed.

However, in some situations this could clog a network if too many devices are passing the message. Thus, mobile device may have a preset limit on how many devices the message can be passed to. For example, mobile device 320 may only pass the message to 10 devices before assuming that one of the 10 devices will find a network connection.

Similarly, mobile device 310 may limit the number of devices it communicates with in order to save battery life. Thus, once the emergency message has been passed to a predetermined number of devices, for example ten, then mobile device 310 stops sending the emergency message altogether or for a time interval. For example, mobile device 310 may stop sending emergency messages for 2 hours. If no response is received in 2 hours then mobile device 310 may again send messages.

In a further embodiment, a cell tower may tell mobile devices to ignore messages from mobile device 310. For example, if the cell tower has received the message, then to avoid network congestion it may tell mobile devices to ignore messages from mobile device 310. Mobile devices receiving the message from the tower may pass the message on to a set number of devices before ignoring all messages about mobile device 310.

In a further embodiment, only the cell tower may send the message to ignore messages from mobile device 310. For example, if the highway passing by mobile device 310 is between cell tower A and cell tower B, then once cell tower A has received the message from mobile device 310 it can tell all mobile devices travelling towards cell tower B to ignore messages from mobile device 310. Similarly, when cell tower B receives the message from mobile device 310, cell tower B can tell all other mobile devices moving towards cell tower A to ignore the message from mobile device 310. In this way, the message does not clog the network.

Format of Emergency Beacon

With any of the embodiments of FIG. 1, 2 or 3, a standardized format for an emergency beacon may be provided to the network in order to allow a responder to respond accurately to the emergency. The present disclosure is not meant to be limited to any particular message format but one message format is provided below as an example.

TABLE 1

EXEMPLARY MESSAGE FORMAT

| Phone number | Available Radio interfaces | Radio Tower Registration History | Last known speed | Last known elevation | Reserved field | Medical conditions |
|---|---|---|---|---|---|---|
| 64 bits | 10 bits | Multiple of 30 bits | 10 bits | 14 bits | Variable | Multiple of 27 bits |

As described in US patent publication number 2011/0111726, the contents of which are incorporated herein by reference, a mobile device may be equipped with a unique and universally accepted identifier. Such identifier may be the telephone number, as shown in Table 1, or some other identifier that may be recognized by a network.

In accordance with Table 1 above, the message in the present embodiment may be a variable length format which includes the phone number of the device. The maximum number of digits required in a telephone number is twenty, which requires 64 bits to forward.

A second field within the message includes available radio interfaces. Ten bits are allocated to the available radio interfaces in the present example, and each bit may represent a flag used to indicate whether or not the mobile device in an emergency situation is capable of communicating using those radio interfaces. The radio interfaces may be standardized and the ten bits may be toggled to indicate whether or not the device supports the radio interfaces. For example, the bits may include GSM, $3^{rd}$ Generation, WiFi a/b/g, WiFi n, GPS, Bluetooth™, Bluetooth™ Low-Energy (BT-LE), ZIGBee, among others.

A third field within the message of Table 1 includes radio tower registration history. In one embodiment, the radio tower registration history may include three bits that indicate how many radio tower registrations are provided within the message. Thus, for example, the example of Table 1 may include up to eight radio tower registration histories. In other embodiments, more bits may be used and more radio tower histories may be stored.

For each radio tower history, the cell-tower identifier, time and date for each cell-tower registration may be stored.

A fourth field in the example of the message of Table 1 may include the last known speed of the device if the device is capable of providing such information.

A fifth field may include the last known the elevation of the device.

A sixth field may be a reserved field, which may have variable information and may be utilized for specific implementations.

A seventh field in the message of Table 1 is a medical condition field. The medical condition field may utilize the IEEE P11073-104 XX format, where the last two digits signify the specific vital sign and the six digits are used to indicate the specific medical condition range. Various information may be passed in this field including blood pressure, allergies, number of vital sign readings, among others.

The broadcasting of the information element of Table 1 above provides information with regard to the identity, location, direction of travel, and contact information for a mobile device that may be in distress. For example, since a telephone number is provided, this may provide emergency responders with a way to contact the device once the emergency responder enters a particular area where the mobile device in the emergency situation is thought to be.

Further, by providing available radio interfaces, the various communication techniques could be used to establish communication with the mobile device are known to first responders and these can be tried as well once the first responders reach the area where they think the mobile device in distress is.

Information within the message may provide an indication as to the direction that the mobile device was traveling (based on cell tower registration) as well as the speed that the mobile device was traveling, and thus will enable a first responder to narrow down the area that the mobile device is in.

In some embodiments the reserved field may be used for information such as the cause of the emergency situation. For example, if the mobile device is equipped within a vehicle, a crash detection system may utilize the reserved field to indicate that a collision has occurred. Other examples would be known to those in the art having regard to the present disclosure.

The standardized message format of Table 1 above provides a short message that can be forwarded to a second mobile device when the second mobile device is only within radio frequency coverage of the first mobile device for a short amount of time. Further, the message provides sufficient information to enable a responder to locate the first mobile device.

Normal Operating Conditions

In one embodiment, a mobile device may take steps to ensure its position is known.

Under normal circumstances, while the mobile device is in cell phone coverage and while a connection is maintained with the cell-tower, the device may register with the cell-tower every twenty minutes and update the cell-tower with information about the mobile device. This may include some of the information of Table 1 above. However, an indication may be provided that no emergency situation exists.

As soon as the mobile device leaves the cell-tower and hands over to a new cell-tower, it saves the cell-tower and time stamp of the last communication in its history registers with the new cell-tower.

As soon as the mobile device reaches the edge of the over lapping mobile network, the mobile device may start beaconing to other devices. In one embodiment, the beaconing may be performed over a specific dedicated emergency frequency, such as frequency 75. However, in other embodiments, the beaconing may be over currently used frequencies or plurality of frequencies.

In such case, mobile devices near the edge of network coverage or outside of network coverage will monitor the dedicated frequency channel.

The beaconing from the mobile device continues as long as no continuous cell-tower coverage is detected. Once the mobile user enters a new continuous mobile network, the mode of operation may terminate.

Assuming that a mobile device loses its radio frequency connectivity with the last cell-tower and is not able to handover to a new cell-tower, while trying to locate the new cell-tower it starts to attempt to detect any mobile users in the proximity. As soon as other mobile users are located within proximity, limited registration is provided including the identifier of the last two cell-towers that the mobile device has registered with, which have the same frequency assignment. The mobile device tries to find out as many other mobile devices as possible and may save the last ten mobile user numbers. This may be used for potential identification of mobile devices to connect with if an emergency situation is declared.

Emergency Situation

A mobile device may declare an emergency situation when it receives an indicator of the emergency situation. Such an indicator may be internal to the mobile device through sensors, or externally through other devices communicating with the mobile device. For example, an emergency situation may be detected if an accelerometer records a high impact or a fall. In other situations, if the user of a mobile device dials 911 or presses some sort of a button or combination of buttons to indicate an emergency, then this might be considered to be an emergency situation.

External sensors which may communicate with the mobile device through some sort of short range communications interface may also trigger an emergency situation. Thus, a smoke, temperature or fume detector may communicate with the mobile device.

Further, the user may be wearing a vital sign indicator such as a heart beat monitor which may communicate with the mobile device. If the vital signs are within dangerous limits or if the heart beat stops or if other monitoring situation is detected, the external sensor may indicate to the mobile device that an emergency situation exists.

The above is not limiting and other emergency detections systems may be provided.

If an emergency situation exists, the mobile device may provide a beacon with the emergency information to a cell-tower if such a connection can be established, and to other mobile devices if the connection cannot be established.

For example, when the mobile device in distress is outside of cell-tower coverage, if other mobile devices are within range and are not moving rapidly, an ad-hoc network such as that described above with regard to FIG. 2 may be established between a cell-tower and the mobile device in distress.

In other situations, a store and forward model such as that described above with regard to FIG. 3 may be utilized. The information in the beacon is provided to a second mobile device which then forwards the information as soon as possible to other mobile devices or to a cell-tower.

In one embodiment, the second mobile device may continue to forward the message to mobile devices until it can either forward the message to a cell-tower or until an indication is received from one of the mobile devices that the receiving mobile device is in cell-tower coverage. In other instances, if the mobile device trying to forward the message receives an indication that it has forwarded a message to another mobile device that is outside of cell-tower coverage, both mobile devices might thereafter try to forward the message, increasing the likelihood that the message will be forwarded to a cell-tower or access point as soon as possible.

Figure 4:
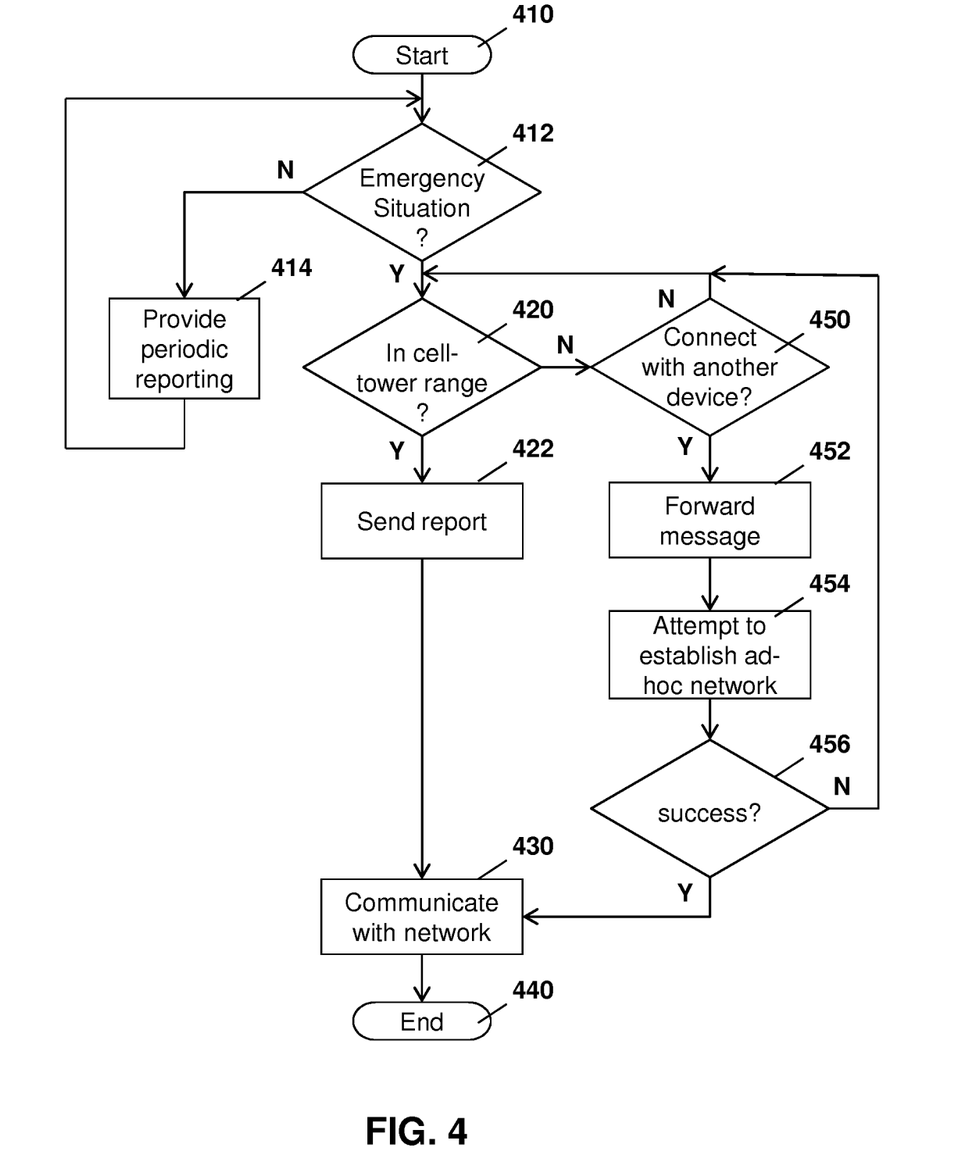
FIG. 4 is a process diagram showing an exemplary process at a mobile device in distress.

Reference is now made to FIG. 4, which shows a flow diagram of an exemplary process at a mobile device that may potentially be in distress. The process of FIG. 4 starts at block 410 and proceeds to block 412 in which a check is made to determine whether an emergency situation exists. As indicated above, the emergency situation may be determined through internal or external sensors or based on the actions of a user of the mobile device.

If no emergency situation exists, the process proceeds from block 412 to block 414 in which periodic reporting may be provided to a network. Such periodic reporting is described above under the heading NORMAL OPERATING CONDITIONS.

If an emergency situation is found to exist at block 412, the process proceeds to block 420 in which a check is made to determine whether the mobile device is in cell-tower range. If yes the process proceeds to block 422 in which a message or report is sent to the network.

The process then proceeds to block 430 in which communication may occur between the mobile device and other entities such as emergency responders.

Once the communication at block 430 is finished the process proceeds to block 440 and ends.

If the check at block 420 determines that the mobile device is not in cell-tower coverage the process proceeds to block 450. At block 450 a check is made to determine whether the mobile device has contact with any other device. If no, the process loops back to block 420 and continues to check whether the device is in cell-tower range or in contact with another device.

From block 450 if the mobile device is in contact with another device, the process proceeds to block 452 in which an emergency message is forwarded to the second mobile device. Such emergency message could be in a standardized format such as that described above.

Once the message has been forwarded the process proceeds to block 454 in which an attempt is made to establish an ad-hoc network.

The process then proceeds to block 456 in which a check is made to determine whether the establishment of the ad-hoc network was successful. If no, the process may proceed back to block 420 in one embodiment and continue trying to forward the emergency message. Alternatively in some embodiments the check at block 456 may also check whether the second mobile device provided an indication of cell-tower coverage, and if yes the process may then end at block 440.

If an ad-hoc network is established the process may proceed to block 430 to allow communication between the mobile device and another entity such as a first responder.

Based on FIG. 4 the mobile device in an emergency situation will continue to attempt to forward an emergency message until cell-tower coverage is achieved either by the mobile device directly or through a second mobile device.

Figure 5:
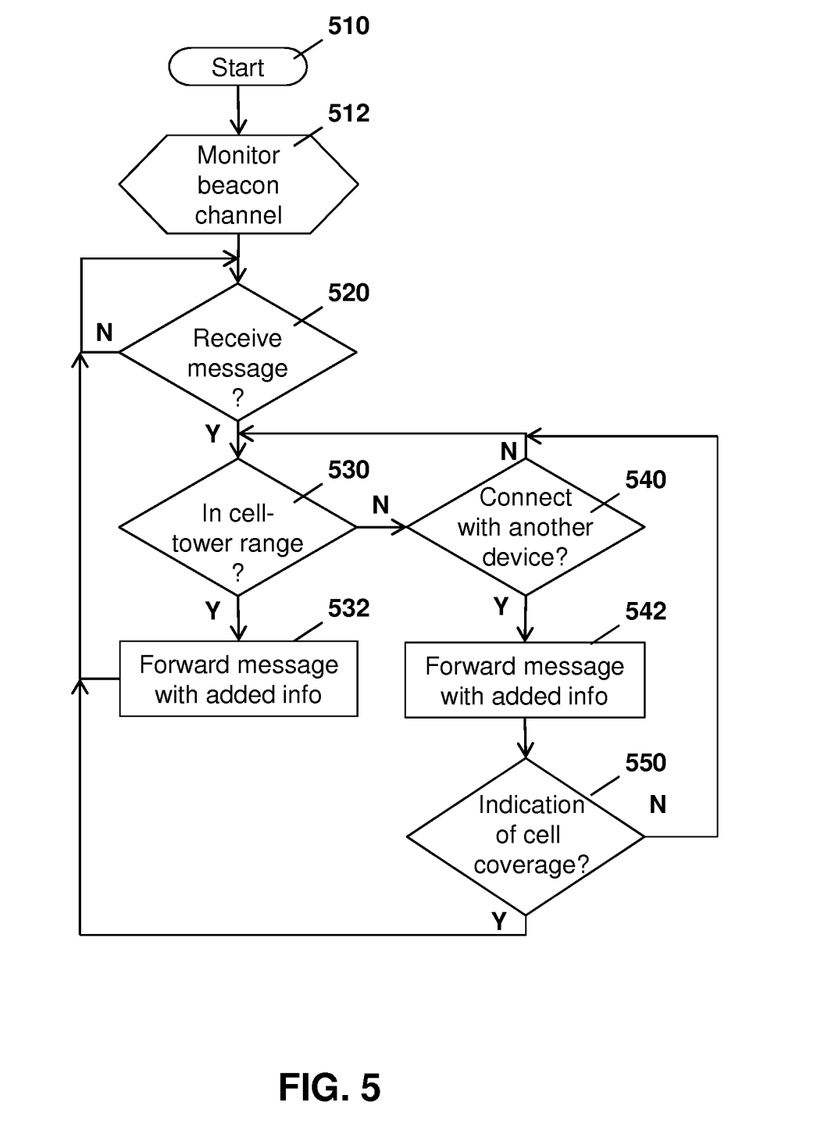
FIG. 5 is a process diagram showing an exemplary process at a mobile device performing store and forward functionality.

From the second mobile device perspective one exemplary process is described with regard to FIG. 5. The process of FIG. 5 starts at block 510 and has a precondition 512 that the device is monitoring a beacon channel. For example, the beacon channel may be a standard medical emergency channel as described above.

The process of FIG. 5 then proceeds to block 520 in which a check is made to determine whether the device has received a message. If no the process continues to loop on block 520 until a message is received.

Once a message is received the process proceeds to block 530 in which a check is made to determine whether the mobile device is in cell-tower coverage. If yes the mobile device forwards the message with added information to the network. The added information may include merely a time stamp indicating when the mobile device received the message. In other embodiments the added information may include the direction and speed of travel of the mobile device, location coordinates for where the device received the message or other added information which may enable a network element to locate the mobile device in distress. In some embodiments the added information may further include contact information for the second mobile device.

As will be appreciated by those in the art having regard to the present disclosure, the device performing the process of FIG. 5 may not be the first device that the mobile in distress contacted. For example, the mobile in distress may have provided the emergency message to a second mobile device which may then have provided the information to a third mobile device. In this case the message may include information about the second mobile device including time stamps, location coordinates or other information, and the third mobile device will append or add its information on top of the second mobile device's information.

In one embodiment, the mobile device may provide an indication to the mobile in distress or mobile from which it received the message that it is in cell-tower coverage if the mobile devices are still capable of communicating with each other.

From block 532 the process proceeds back to block 520 and the mobile device continues to monitor whether it has received a message.

If, in block 530, it is determined that the mobile device is not within cell-tower coverage, the process proceeds to block 540 in which a check is made to determine whether the mobile device can see other mobile devices. If no the process proceeds back to block 530 and continues to loop between blocks 530 and 540 until the mobile device either moves within cell-tower coverage or into range of another device.

If the mobile device can see other devices at block 540 the process proceeds to block 542 in which the message is forwarded with information added, as described above.

The process then proceeds to block 550 in which a check is made to determine whether an indication was received from the other device whether the other device was in cell-tower coverage. If no the process may proceed back to block 530 to continue to try to send the message. Conversely, if an indication of cell-tower coverage is received, the process may proceed from block 550 back to block 520 in which the mobile device continues to monitor whether it has received a message.

The above may be illustrated by way of examples, provided below. However, the examples below are merely meant to be illustrative and are not limiting.

In-Vehicle Collision Detection System

A vehicle may have an on-board collision detection system which may communicate, for example, through a Bluetooth interface, with a user's mobile device. In other embodiments, the in-vehicle collision detection system may have a direct cellular connection from the vehicle itself.

If the user is driving in a rural area and collision occurs, the mobile device or in-vehicle cellular system may then attempt to communicate with a cell-tower. However, if the cell-tower is not within range, the communication interface may then try to communicate with other mobile devices.

In one example, the collision may have taken place close to a highway where other vehicles pass and thus, the store and forward model described above may be utilized where the communication interface provides a specified format as a beacon and other mobile devices may be listening for the beacon on the beacon channel as they pass. If the beacon is detected by a second mobile device, the second mobile device may then try to forward the message to a cell-tower if the cell-tower is in reach and if not may store the message and try to forward the message to a cell-tower or other mobile devices as the second mobile device moves along the highway.

Once the second mobile device obtains cell-tower or access point coverage, the beacon, along with a timestamp, or other information such as speed or direction indication if available may be provided to the cell-tower.

Upon receiving the emergency beacon, the appropriate authorities such as paramedic or fire department may be dispatched to the area from which the emergency beacon came. Once the fire department or paramedics are within a certain distance or area of the location of the emergency, they may to attempt to use the phone number or radio interfaces provided in the emergency beacon to contact the mobile device to further pinpoint the location of the device.

The above is further facilitated if, before the collision occurred, the mobile device inside the vehicle stored a record of cell-towers it had connected to and provided registration information to those cell-towers. Also, if the mobile device periodically registered with either the network or through other devices before the emergency occurred, such information may be used to identify the location of the mobile device.

Jogger

Another example involves a runner with a heart rate monitor that communicates with a mobile device. If the heart rate monitor notes an abnormal condition, it may start the emergency procedures. Again, if the mobile device is within cell phone coverage the emergency procedures may simply be to provide the emergency message to the mobile network or access point. Otherwise, the mobile device will attempt to establish an ad-hoc network or provide communication to a mobile device in a store and forward fashion as described above. The information provided by the mobile device may provide the medical condition in a field of the message, which may indicate to a first responder the nature of the emergency.

Further, location of the mobile device may be determined based on information provided in a message including the last known cell-tower connections, the speed, the elevation, the last seen cellular telephones among other information which will assist the first responders to find the mobile device.

Other examples will be known to those in the art.

The present disclosure may be used with any mobile device and in particular one mobile device is described below with regard to FIG. 6.

Mobile device 600 is typically a two-way wireless communication device having voice and data communication capabilities. Mobile device 600 generally has the capability to communicate with other computer systems on the Internet. Depending on the exact functionality provided, the mobile device may be referred to as a data messaging device, a two-way pager, a wireless e-mail device, a cellular telephone with data messaging capabilities, a wireless Internet appliance, a wireless device, a user equipment, or a data communication device, as examples.

Where mobile device 600 is enabled for two-way communication, it will incorporate a communication subsystem 611, including both a receiver 612 and a transmitter 614, as well as associated components such as one or more antenna elements 616 and 618, local oscillators (LOs) 613, and a processing module such as a digital signal processor (DSP) 620. As will be apparent to those skilled in the field of communications, the particular design of the communication subsystem 611 will be dependent upon the communication network in which the device is intended to operate. The radio frequency front end of communication subsystem 611 can be any of the embodiments described above.

Network access requirements will also vary depending upon the type of network 619. In some networks network access is associated with a subscriber or user of mobile device 600. A mobile device may require a removable user identity module (RUIM) or a subscriber identity module (SIM) card in order to operate on a network. The SIM/RUIM interface 644 is normally similar to a card-slot into which a SIM/RUIM card can be inserted and ejected. The SIM/RUIM card can have memory and hold many key configurations 651, and other information 653 such as identification, and subscriber related information.

When required network registration or activation procedures have been completed, mobile device 600 may send and receive communication signals over the network 619. As illustrated in FIG. 6, network 619 can consist of multiple base stations communicating with the mobile device. For example, in a hybrid CDMA 1×EVDO system, a CDMA base station and an EVDO base station communicate with the mobile station and the mobile device is connected to both simultaneously. Other examples of network technologies and base stations would be apparent to those in the art.

In other embodiments, mobile device 600 may use communications subsystem 611 to communicate with another mobile device, as described above with regards to FIGS. 2 to 5.

Signals received by antenna 616 are input to receiver 612, which may perform such common receiver functions as signal amplification, frequency down conversion, filtering, channel selection and the like. A/D conversion of a received signal allows more complex communication functions such as demodulation and decoding to be performed in the DSP 620. In a similar manner, signals to be transmitted are processed, including modulation and encoding for example, by DSP 620 and input to transmitter 614 for digital to analog conversion, frequency up conversion, filtering, amplification and transmission over the communication network 619 via antenna 618. DSP 620 not only processes communication signals, but also provides for receiver and transmitter control. For example, the gains applied to communication signals in receiver 612 and transmitter 614 may be adaptively controlled through automatic gain control algorithms implemented in DSP 620.

Mobile device 600 generally includes a processor 638 which controls the overall operation of the device. Communication functions, including data and voice communications, are performed through communication subsystem 611. Processor 638 also interacts with further device subsystems such as the display 622, flash memory 624, random access memory (RAM) 626, auxiliary input/output (I/O) subsystems 628, serial port 630, one or more keyboards or keypads 632, speaker 634, microphone 636, other communication subsystem 640 such as a short-range communications subsystem and any other device subsystems generally designated as 642. Serial port 630 could include a USB port or other port known to those in the art.

Figure 6:
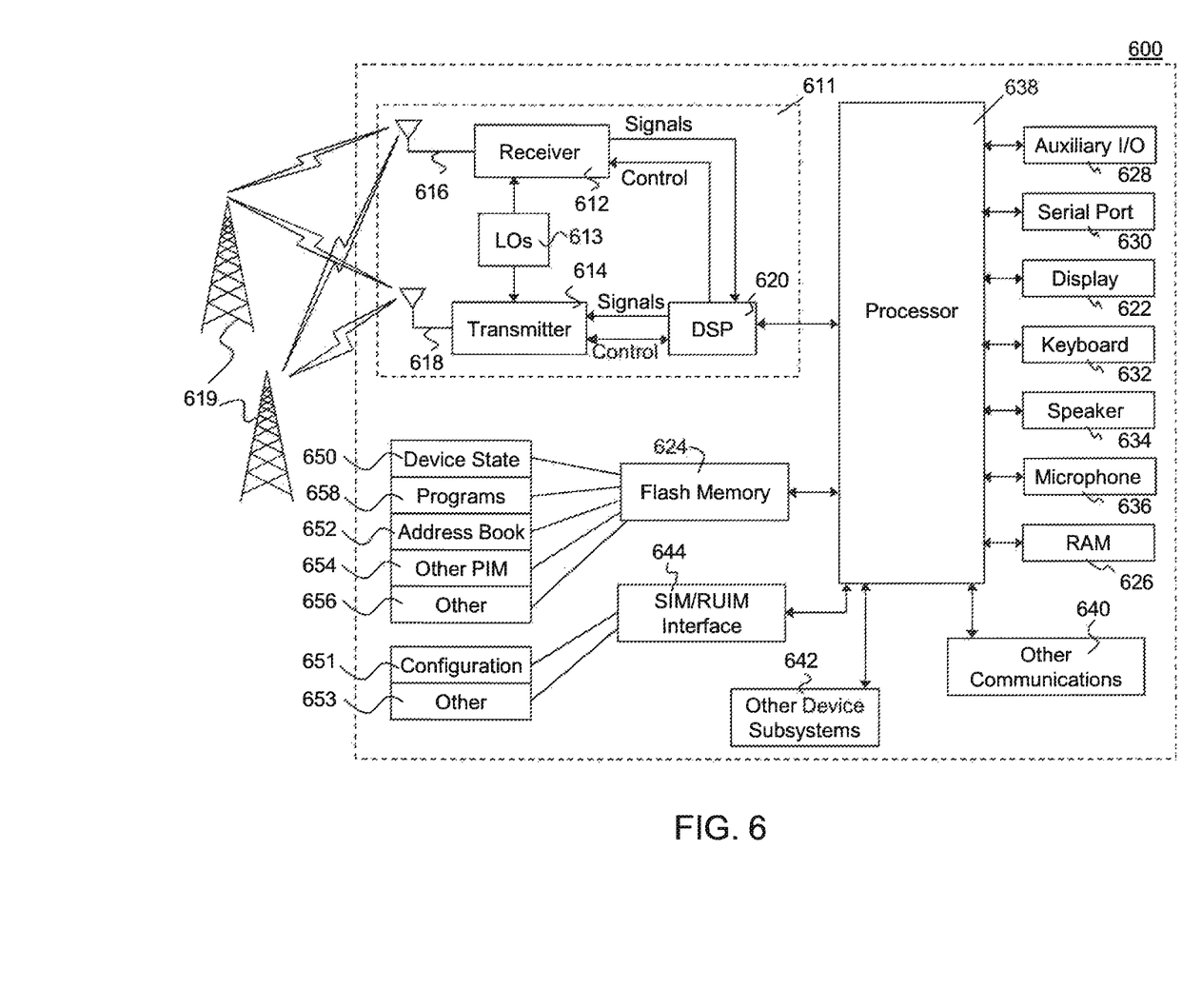
FIG. 6 is a block diagram of an exemplary mobile device capable of being used with the present systems and methods.

Some of the subsystems shown in FIG. 6 perform communication-related functions, whereas other subsystems may provide "resident" or on-device functions. Notably, some subsystems, such as keyboard 632 and display 622, for example, may be used for both communication-related functions, such as entering a text message for transmission over a communication network, and device-resident functions such as a calculator or task list.

Operating system software used by the processor 638 may be stored in a persistent store such as flash memory 624, which may instead be a read-only memory (ROM) or similar storage element (not shown). Those skilled in the art will appreciate that the operating system, specific device applications, or parts thereof, may be temporarily loaded into a volatile memory such as RAM 626. Received communication signals may also be stored in RAM 626.

As shown, flash memory 624 can be segregated into different areas for both computer programs 658 and program data storage 650, 652, 654 and 656. These different storage types indicate that each program can allocate a portion of flash memory 624 for their own data storage requirements. Processor 638, in addition to its operating system functions, may enable execution of software applications on the mobile device. A predetermined set of applications that control basic operations, including at least data and voice communication applications for example, will normally be installed on mobile device 600 during manufacturing. Other applications could be installed subsequently or dynamically.

Applications and software may be stored on any computer readable storage medium. The computer readable storage medium may be a tangible or intransitory/non-transitory medium such as optical (e.g., CD, DVD, etc.), magnetic (e.g., tape) or other memory known in the art.

One software application may be a personal information manager (PIM) application having the ability to organize and manage data items relating to the user of the mobile device such as, but not limited to, e-mail, calendar events, voice mails, appointments, and task items. Naturally, one or more memory stores would be available on the mobile device to facilitate storage of PIM data items. Such PIM application may have the ability to send and receive data items, via the wireless network 619. In one embodiment, the PIM data items are seamlessly integrated, synchronized and updated, via the wireless network 619, with the mobile device user's corresponding data items stored or associated with a host computer system. Further applications may also be loaded onto the mobile device 600 through the network 619, an auxiliary I/O subsystem 628, serial port 630, short-range communications subsystem 640 or any other suitable subsystem 642, and installed by a user in the RAM 626 or a non-volatile store (not shown) for execution by the processor 638. Such flexibility in application installation increases the functionality of the device and may provide enhanced on-device functions, communication-related functions, or both. For example, secure communication applications may enable electronic commerce functions and other such financial transactions to be performed using the mobile device 600. Further, social networking applications, multi-media applications, games, business application or other applications may also be stored and used.

In a data communication mode, a received signal such as a text message or web page download will be processed by the communication subsystem 611 and input to the processor 638, which may further process the received signal for output to the display 622, or alternatively to an auxiliary I/O device 628.

A user of mobile device 500 may also compose data items such as email messages for example, using the keyboard 632, which may be a complete alphanumeric keyboard or telephone-type keypad, among others, either real or virtual, in conjunction with the display 622 and possibly an auxiliary I/O device 628. Such composed items may then be transmitted over a communication network through the communication subsystem 611.

For voice communications, overall operation of mobile device 600 is similar, except that received signals would typically be output to a speaker 634 and signals for transmission would be generated by a microphone 636. Alternative voice or audio I/O subsystems, such as a voice message recording subsystem, may also be implemented on mobile device 600. Although voice or audio signal output is accomplished primarily through the speaker 634, display 622 may also be used to provide an indication of the identity of a calling party, the duration of a voice call, or other voice call related information for example.

Serial port 630 in FIG. 6 would normally be implemented in a personal digital assistant (PDA)-type mobile device for which synchronization with a user's desktop computer (not shown) may be desirable, but is an optional device component. Such a port 630 would enable a user to set preferences through an external device or software application and would extend the capabilities of mobile device 600 by providing for information or software downloads to mobile device 600 other than through a wireless communication network. The alternate download path may for example be used to load an encryption key onto the device through a direct and thus reliable and trusted connection to thereby enable secure device communication. As will be appreciated by those skilled in the art, serial port 630 can further be used to connect the mobile device to a computer to act as a modem.

Other communications subsystems 640, such as a short-range communications subsystem, is a further optional component which may provide for communication between mobile device 600 and different systems or devices, which need not necessarily be similar devices. For example, the subsystem 640 may include an infrared device and associated circuits and components or a Bluetooth™ communication module, or a near field communications module, or a ZigBee communications module, among others, to provide for communication with similarly enabled systems and devices.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method at a first mobile device comprising:
   receiving a message from a second mobile device;
   adding information to the message associated with a location of a contact between the first mobile device and the second mobile device;
   forwarding the message to a network if a network connection is available for the first mobile device;
   forwarding the message to a third mobile device if no network connection is available for the first mobile device;
   waiting a predetermined amount of time for a network connection indication from the third mobile device before attempting to forward the message to a fourth mobile device; and
   forwarding the message to the fourth mobile device if no network connection indication is received from the third mobile device during the predetermined amount of time,
   wherein the network connection indication from the third mobile device, if received, indicates that a network connection is available to the third mobile device.

2. The method of claim 1, wherein the information added includes a timestamp for receipt of the message.

3. The method of claim 2, wherein the information added further includes a speed and direction of travel of the first mobile device.

4. The method of claim 1, wherein the information added includes a location where first mobile device receives the message from the second mobile.

5. The method of claim 1, wherein the receiving is over a dedicated Global System for Mobile Communications-based channel.

6. The method of claim 1, wherein the message is in a predetermined format and is one of an emergency message, a reminder, a short email or high priority message.

7. The method of claim 6, wherein the message includes at least one of:
   a plurality of base stations connected to and a timestamp for each of the plurality of base station connections;
   speed of travel;
   an elevation;
   a medical condition;
   a personal message or reminder; and
   a telephone number or unique identifier for the first mobile device.

8. The method of claim 1, wherein the message includes information from an originating mobile device along with information from intervening mobile devices on a communication path between the originating mobile device and said mobile device.

9. The method of claim 1, further comprising storing the message and added information if no network connection is available and communication is not possible with a third mobile device.

10. The method of claim 1, wherein the forwarding is limited to a predetermined number of devices.

11. The method of claim 1, further comprising receiving a message from a network element to ignore further communications regarding the second mobile device, and forwarding the message from the network element to other mobile devices.

12. A mobile device comprising:
    a processor; and
    a communications subsystem,
    wherein the processor and communications subsystem are configured to:
    receive a message from a second mobile device;
    add information to the message that can be used to determine a location of the second mobile device;
    forward the message to a network if a network connection is available for a first mobile device;
    forward the message to a third mobile device if no network connection is available for the first mobile device;
    wait a predetermined amount of time for a network connection indication from the third mobile device before attempting to forward the message to a fourth mobile device; and
    forward the message to the fourth mobile device if no network connection indication is received from the third mobile device during the predetermined amount of time,
    wherein the network connection indication from the third mobile device, if received, indicates that a network connection is available to the third mobile device.

13. The mobile device of claim 12, wherein the message includes information from an originating mobile device along with information from intervening mobile devices on a communication path between the originating mobile device and said mobile device.

14. The mobile device of claim 12, further comprising memory, the mobile device configured to store the message and the added information in the memory if no network connection is available and communication is not possible with the third mobile device.

15. The mobile device of claim 12, wherein the processor and communications subsystem are configured to forward the message to only a limited predetermined number of devices.

16. The mobile device of claim 12 wherein the information added includes at least one of: a timestamp for receipt of the message, a speed and direction of travel of the first mobile device, or a location where first mobile device receives the message from the second mobile.

17. A method at a mobile device comprising:
receiving an indication that an emergency condition exists;
sending a message from the mobile device to a network element if a network connection between the mobile device and the network element exists;
sending the message from the mobile device to a second mobile device if no network connection between the mobile device and a network element exists;
waiting a predetermined amount of time for a network connection indication from the second mobile device before attempting to send the message to a third mobile device; and
sending the message to the third mobile device if no network connection indication is received from the second mobile device during the predetermined amount of time,
wherein the network connection indication from the second mobile device, if received, indicates that the second mobile device has a network connection to the network element.

18. The method of claim 17, wherein the emergency indication is received from one of an internal sensor or over a short range communication interface from an external device.

19. The method of claim 17, wherein the message is of a predetermined format that includes at least one of a phone number or identifier for the mobile device, a supported communications field, a history of network connections field, a last known speed field, a last known elevation field, and a medical condition field.

20. The method of claim 17, wherein the sending the message is limited to sending to a predetermined number of mobile devices.

21. The method of claim 17, wherein the sending to at least one of the second and third mobile devices utilizes a dedicated beacon channel.

22. A mobile device comprising:
a processor; and
a communications subsystem,
wherein the processor and communications subsystem are configured to:
receive an indication that an emergency condition exists;
send a message from the mobile device to a network element if a network connection between the mobile device and the network element exists;
send the message from the mobile device to a second mobile device if no network connection between the mobile device and a network element exists;
wait a predetermined amount of time for a network connection indication from the second mobile device before attempting to send the message to a third mobile device; and
send the message to the third mobile device if no network connection indication is received from the second mobile device during the predetermined amount of time,
wherein the network connection indication from the second mobile device, if received, indicates that the second mobile device has a network connection to the network element.

23. The mobile device of claim 22, wherein the message is of a predetermined format that includes at least one of a phone number or identifier for the mobile device, a supported communications field, a history of network connections field, a last known speed field, a last known elevation field, and a medical condition field.

24. The mobile device of claim 22,
wherein the mobile device is configured to send the message to only a predetermined number of mobile devices.

* * * * *